United States Patent
Boucher et al.

(10) Patent No.: US 9,284,422 B2
(45) Date of Patent: Mar. 15, 2016

(54) METHOD OF PREPARING A TRANSPARENT POLUMER MATERIAL COMPRISING A THERMOPLASTIC POLYCARBONATE AND MINERAL NANOPARTICLES

(75) Inventors: Virginie Boucher, Villeneuve d'ascq (FR); Alexandra Roos, Charenton-le-Pont (FR); Sophie Duquesne, Villeneuve d'Ascq (FR); Serge Bourbigot, Villeneuve d'Ascq (FR); Laure Meynie, Paris (FR); Karine Cavalier, Arles (FR); Didier Sy, Salin de Giraud (FR); Marc Lacroix, Louvain-la-Neuve (BE)

(73) Assignees: ESSILOR INTERNATIONAL (COMPAGNIE GENERALE D'OPTIQUE), Salin-de-Giraud (FR); RENAULT S.A.S.; SOLVAY SA, Boulogne Billancourt (BE)

( * ) Notice: Subject to any disclaimer, the term of this patent is extended or adjusted under 35 U.S.C. 154(b) by 610 days.

(21) Appl. No.: 12/746,011

(22) PCT Filed: Dec. 9, 2008

(86) PCT No.: PCT/FR2008/052251
§ 371 (c)(1),
(2), (4) Date: Oct. 25, 2010

(87) PCT Pub. No.: WO2009/080974
PCT Pub. Date: Jul. 2, 2009

(65) Prior Publication Data
US 2011/0034588 A1  Feb. 10, 2011

(30) Foreign Application Priority Data
Dec. 13, 2007 (FR) ..................... 07 59808

(51) Int. Cl.
| | | |
|---|---|---|
| *C08J 3/22* | (2006.01) | |
| *B82Y 30/00* | (2011.01) | |
| *C08J 5/00* | (2006.01) | |
| *C08L 69/00* | (2006.01) | |
| *C08K 3/26* | (2006.01) | |
| *C08K 5/00* | (2006.01) | |
| *C08L 25/04* | (2006.01) | |
| *C08L 33/12* | (2006.01) | |

(52) U.S. Cl.
CPC ................ *C08J 3/226* (2013.01); *B82Y 30/00* (2013.01); *C08J 5/005* (2013.01); *C08L 69/00* (2013.01); *C08J 2369/00* (2013.01); *C08J 2425/00* (2013.01); *C08J 2433/00* (2013.01); *C08J 2469/00* (2013.01); *C08K 3/26* (2013.01); *C08K 5/005* (2013.01); *C08L 25/04* (2013.01); *C08L 33/12* (2013.01)

(58) Field of Classification Search
CPC ......... C08L 25/06; C08L 69/00; C08L 33/12; C08K 3/08
USPC .......... 523/200, 205, 209, 212, 351; 524/423, 524/424, 425, 430
See application file for complete search history.

(56) References Cited

U.S. PATENT DOCUMENTS

| | | | |
|---|---|---|---|
| 7,833,614 B2 * | 11/2010 | Suzuki et al. ................ 428/212 |
| 2002/0123550 A1 | 9/2002 | Border et al. | |
| 2003/0130399 A1 * | 7/2003 | Mehta et al. ................ 524/445 |
| 2006/0121190 A1 * | 6/2006 | Tsujino et al. ................ 427/226 |
| 2006/0217478 A1 | 9/2006 | Denisyuk et al. | |
| 2007/0042137 A1 | 2/2007 | Rao et al. | |
| 2007/0142535 A1 | 6/2007 | Wenz et al. | |
| 2007/0190314 A1 * | 8/2007 | Aiki et al. ................ 428/327 |
| 2008/0119631 A1 * | 5/2008 | Mullen ................ 528/203 |
| 2010/0137500 A1 * | 6/2010 | Goossens et al. ............. 524/537 |
| 2011/0034585 A1 * | 2/2011 | Christmann et al. ......... 523/209 |

FOREIGN PATENT DOCUMENTS

| | | |
|---|---|---|
| CN | 1631975 | 6/2005 |
| TW | 251603 | 3/2006 |

OTHER PUBLICATIONS

French Search Report dated Jun. 10, 2009.
International Search Report dated Jun. 17, 2009.

* cited by examiner

*Primary Examiner* — Hannah Pak
(74) *Attorney, Agent, or Firm* — Sofer & Haroun, LLP

(57) ABSTRACT

A method of preparing a transparent polymer material includes mixing mineral nanoparticles selected from nanoparticles of alkaline-earth metal carbonates, alkaline-earth metal sulfates, metallic oxides, oxides of metalloids, and siloxanes, and a composition A including at least one thermoplastic polymer in the molten state selected from polycarbonate (PC), polystyrene (PS) and polymethyl methacrylate (PMMA) in order to obtain a master-batch, the mixture of step i) including at least 25% and at most 75% by weight of the mineral nanoparticles. The master-batch obtained in step i) is mixed with a composition B of a thermoplastic polycarbonate matrix (PCm) in the molten state, to obtain a transparent polymer material including at most 10% by weight of the mineral nanoparticles, preferably at most 5% by weight of the mineral nanoparticles.

37 Claims, No Drawings

METHOD OF PREPARING A TRANSPARENT POLUMER MATERIAL COMPRISING A THERMOPLASTIC POLYCARBONATE AND MINERAL NANOPARTICLES

RELATED APPLICATIONS

This application is a National Phase application of PCT/FR2008/052251, filed on Dec. 9, 2008, which in turn claims the benefit of priority from French Patent Application No. 07 59808, filed on Dec. 13, 2007, the entirety of which are incorporated herein by reference.

BACKGROUND

1. Field of the Invention

The present invention relates to a method of preparing a transparent polymer material comprising a thermoplastic polycarbonate and nanoparticles, as well as to a transparent polymer material obtained by said method.

The invention typically applies, but not exclusively, to the fields of optics, in particular to optical articles of the aiming instrumentation lens type, helmet visor type, or ophthalmic lens type, and to optical articles of the automobile glass type.

More particularly, the term "ophthalmic lens" means lenses that are in particular suitable for mounting in eyeglasses, having the function of protecting the eye and/or correcting vision, such lenses being selected from afocal, single-vision, bifocal, trifocal and progressive lenses.

More particularly, the term "automobile glass" not only means external transparent bodywork elements such as rear lights, side panels, side windows, glazed roofs, headlight or sidelight glazing, but also transparent elements for the interior, such as dashboard, dial, or screen glazing.

2. Description of Related Art

Polycarbonate enjoys advantages that render it particularly advantageous for optics, in particular excellent transparency, excellent resistance to impacts, a high refractive index, and being very lightweight. In contrast, its principal disadvantages lie in it not being very rigid and being sensitive to scratching and abrasion.

In order to improve the mechanical properties of a polymer, in particular its rigidity and its abrasion and scratch resistance, it is known to add mineral nanoparticles to the polymer. Typically, said mineral nanoparticles are incorporated directly into the polymer in the molten state. However, that process applied to a thermoplastic polycarbonate does not guarantee good dispersion of the nanoparticles in the thermoplastic polycarbonate matrix and frequently results in degradation of said matrix.

The material obtained thereby is thus less transparent and less impact resistant compared with a thermoplastic polycarbonate material including no nanoparticles.

OBJECTS AND SUMMARY

The aim of the present invention is to provide a method of preparing a transparent polymer material comprising both a thermoplastic polycarbonate and nanoparticles, and that does not suffer from the above-mentioned disadvantages.

Thus, the invention provides a method of preparing a transparent polymer material, the method comprising the following steps:

i) mixing mineral nanoparticles selected from nanoparticles of alkaline-earth metal carbonates, alkaline-earth metal sulfates, metallic oxides, oxides of metalloids, and siloxanes, and a composition A including at least one thermoplastic polymer in the molten state selected from polycarbonate (PC), polystyrene (PS), and polymethyl methacrylate (PMMA) in order to obtain a master-batch, the mixture of step i) including at least 25% and at most 75% by weight of said mineral nanoparticles; and ii) mixing the master-batch obtained in step i) with a composition B comprising a thermoplastic polycarbonate matrix (PCm) in the molten state, to obtain a transparent polymer material including at most 10% by weight of said mineral nanoparticles, preferably at most 5% by weight of said mineral nanoparticles.

The preparation method of the present invention can significantly limit degradation of the PCm matrix when nanoparticles have been incorporated. It can also limit the phenomenon of aggregation of the nanoparticles during their incorporation into the PCm matrix, guaranteeing a homogeneous dispersion of said nanoparticles in said matrix.

In particular, it means that the light transmission and impact resistance are maintained as much as possible compared with a thermoplastic polycarbonate material per se, and it means that the mechanical properties of the transparent polymer material are improved during incorporation of the mineral nanoparticles into the polycarbonate matrix (PCm).

The material obtained by the preparation method of the invention thus has improved rigidity as well as improved abrasion and scratch resistance compared with a thermoplastic polycarbonate material in routine use in the field of optics.

The term "transparent polymer material" means a material through which an image is observed with no significant loss of contrast. In other words, interposing said transparent polymer material between an image and an observer thereof does not significantly reduce the quality of the image.

The term "molten state" means a state in which the thermoplastic polymer of step i) or the thermoplastic polycarbonate matrix of step ii) is in a malleable state. This malleable state, well known to the skilled person, may conventionally be obtained when the polymer in question is heated to a temperature above its glass transition temperature, or softening temperature.

In the text of the present invention, the expression "in the range value x to value y" means that the values x and y are included in this range of values.

The thermoplastic polycarbonate (PC) used in step i) and the thermoplastic polycarbonate (PCm) used in step ii) may be identical or different. Preferably, the sources of the polycarbonate used in step i) and in step ii) are identical.

In the context of the invention, the mixture of step i) may preferably include at least 40% and at most 60% by weight of mineral nanoparticles, and more preferably 50% by weight of mineral nanoparticles.

Typically, at least one of the dimensions of the mineral nanoparticles of the present invention is nanometric ($10^{-9}$ meter) in scale.

The term "dimension" means the number average dimension of the set of nanoparticles of a given population, said dimension being determined conventionally using methods that are well known to the skilled person.

According to said methods of determining the size of the nanoparticles, the "dimension" of the nanoparticles according to the present invention makes reference either to the Stokes diameter (if the method used is that of sedimentation by centrifuging and X ray analysis) or to the diffusion diameter (if the method used is that of diffusion of light by laser granulometry), or to the diffraction diameter (if the method used is that of diffraction of light by laser granulometry), or to the width (l) of nanoparticles defined as the smallest dimension of the nanoparticles (if the method used is that of electron microscopy, such as scanning electron microscopy (SEM) or transmission electron microscopy (TEM)); the latter method is preferred.

These four methods of determining the dimension of the nanoparticles may produce substantially different results. For this reason, the results obtained must satisfy the nanometric dimension condition for the nanoparticles of to the invention for at least one of the four above-mentioned methods, preferably at least two of these methods, preferably at least three of these methods, and more preferably these four methods.

The dimension of the mineral nanoparticles of the invention is in particular at most 400 nanometers (nm), preferably at most 300 nm, and more preferably at most 100 nm.

Particularly preferably, this dimension is at least 0.1 nm and at most 80 nm, more preferably at least 10 nm and at most 70 nm, for example equal to 40 nm.

The mineral nanoparticles of the mixture of step i) may also be defined by their form factor, corresponding to the ratio between a specified "largest dimension" (L) of a particle, generally termed the "length", and a specified "smallest dimension" of the particle, generally termed the "width" or "diameter", mentioned below by the letter "l".

The form factor is conventionally determined by analyzing microscopy images, in particular by electron microscopy (SEM or TEM). The largest dimension L as well as the smallest dimension l of a nanoparticle are measured directly by SEM or by TEM and thus can be used to calculate the ratio L to l.

The mean form factor for a population of nanoparticles in accordance with the present invention is defined as the number average of the form factors for each nanoparticle taken individually, or in other words the number average of the ratio of the length L to the width l of each nanoparticle.

The form factor of the mineral nanoparticles of the present invention is equal to 1.0.

Advantageously, prior to their incorporation into the mixture of step i), the mineral nanoparticles of the present invention may undergo a "surface" treatment to improve their dispersion in said mixture and thus to limit aggregation thereof.

By way of example, the surface treatment may consist in pre-coating the nanoparticles with a layer of a polyacrylate, polybutadiene type polymer grafted with maleic anhydride, methacrylsilane, or aminosilane.

Other types of surface treatment of said nanoparticles may be envisaged, in particular the functionalization or grafting of said nanoparticles, said surface treatments being well known to the skilled person.

Of the mineral nanoparticles in accordance with the present invention, the nanoparticles of alkaline-earth metal carbonates may be nanoparticles of calcium carbonate, those of alkaline-earth metal sulfates, nanoparticles of barium sulfate, those of metallic oxides, nanoparticles of alumina, of zinc oxide, or of titanium dioxide, those of oxides of metalloids, nanoparticles of silicon dioxide and those of siloxanes, nanoparticles of silsesquioxanes, and more particularly nanoparticles of trisilanolphenyl polyhedral silsesquioxane (TP-POSS). Preferred mineral nanoparticles from this list are nanoparticles of calcium carbonate.

In order to further improve the mechanical and optical properties of the polymer material of the present invention, the mixture of step ii) may further include at least one antioxidant.

In accordance with a first variation, composition B is prepared prior to step ii) by mixing the antioxidant or antioxidants with the thermoplastic polycarbonate matrix (PCm) in the molten state.

In accordance with a second variation, composition A is prepared prior to step i) by mixing the antioxidant or antioxidants with the thermoplastic polymer in the molten state (PC, PS or PMMA), preferably with the polycarbonate (PC).

In accordance with a third variation, the antioxidant or antioxidants may be added directly during step ii), or in other words to the mixture of step ii).

In accordance with a fourth variation, the antioxidant or antioxidants may be added directly during step i), or in other words to the mixture of step i).

The antioxidant or antioxidants used in these four variations are at least partially soluble in the thermoplastic polycarbonate matrix of step ii), and in the second or fourth variation at least partially soluble in the thermoplastic polymer of step i).

Preferably, and in particular when the thermoplastic polymer of composition A is polycarbonate, the master-batch and composition B include at least one antioxidant. The antioxidant or antioxidants present in the master-batch and composition B may be identical or different. Preferably, the antioxidants present in the master-batch and the composition B are identical.

Particularly preferably, the agent or agents are added to compositions A and B during an additional step.

Advantageously, composition A may include at most 15% by weight of antioxidant, and more particularly at least 0.5% by weight of antioxidant.

Preferably, composition A may include a quantity in the range 2% to 12% by weight of antioxidant, more preferably at most 10% by weight of antioxidant, and still more preferably 5% by weight of antioxidant.

Advantageously, composition B may include at most 5% by weight of antioxidant, preferably at least 0.5% and more particularly at least 0.1%.

Preferably, composition B may include in the range 0.5% to 2% by weight of antioxidant.

Thus, in accordance with the implementation carried out in the context of the invention, the mixture of step ii) may include at most 5% by weight of antioxidant, preferably in the range 1% to 2% by weight of antioxidant. Beyond such a quantity of antioxidant in the mixture of step ii), the transparent polymer material obtained may suffer degraded mechanical properties.

For this reason, whatever the variation or variations for adding the antioxidant, the transparent polymer material of the present invention may include at most 5% by weight of antioxidant, preferably in the range 1% to 2% by weight of antioxidant, in order to guarantee the best compromise between optimal rigidity and almost non-existent coloration.

The antioxidant or antioxidants of the invention may be any type of antioxidant that is well known to the skilled person. Preferably, the antioxidant used comprises a phosphite. Examples of antioxidants that may be mentioned are Ultranox® 626, Irgafos® 168, and Irganox® HP2921.

In accordance with a particular implementation, the mixture of step ii) may further comprise a compatibilizing agent when the mixture of step i) comprises polystyrene (PS) and/or polymethyl methacrylate (PMMA).

The term "compatibilizing agent" means any polymeric or mineral element with a certain affinity of the miscibility and/or reactivity type with both the thermoplastic polymer of step i) and the PCm matrix. The compatibilizing agent may in particular improve the rigidity of the transparent polymer material of the present invention.

The compatibilizing agent of the polymeric element type may be a block, graft, or random copolymer, in which one of its constituents has a specific affinity of the miscibility type for the polymer of step i), while another has a miscibility and/or reactivity type affinity for the PC matrix. Particularly preferably, the components of the compatibilizing copolymer are constituted by the same monomeric motifs as those of the polymers to be compatibilized, or at least one of them. By way of example, the compatibilizing agent of the polymeric element type is a copolymer of polystyrene, in particular a copolymer of polystyrene and maleic anhydride.

A preferred mineral element type compatibilizing agent that may be used is a natural montmorillonite that is surface-modified with functional hydroxyl type groups.

In order to guarantee the optimal mechanical properties of the transparent polymer material of the present invention, it is preferable for the mixture of step ii) to include at most 5% by weight of compatibilizing agent, preferably in the range 0.1% to 2% by weight of compatibilizing agent, and more preferably in the range 0.3% to 1% by weight of compatibilizing agent.

The mixing method used for the various steps of the method of preparing a transparent polymer material may be an extrusion method. However, this method is not in any way limiting and any other method that is well known to the skilled person may be employed.

The present invention also provides a transparent polymer material obtained by the preparation method defined above, having remarkable mechanical and optical properties.

A first technical feature of this polymer material is that it has a light transmission loss, in particular at 650 nm, compared with a reference material obtained solely from the thermoplastic polycarbonate matrix (PCm), of at most 25%, preferably at most 10%, and more preferably in the range 1% to 3%.

A second technical feature of this material is that it has an increase in the bending modulus compared with a reference material obtained solely from the thermoplastic polycarbonate matrix (PCm), of at least 10%, preferably in the range 20% to 60%.

A third technical feature of this material is that it has a molecular weight loss compared with a reference material obtained solely from the thermoplastic polycarbonate matrix (PCm), induced by incorporation of the mineral nanoparticles, of at most 30%, preferably at most 20%, and more preferably at most 10%.

The present invention also provides the use of said transparent polymer material for the manufacture of optical articles of the aiming instrumentation lens type, helmet visor type, or ophthalmic lens type, and to optical articles of the automobile glass type.

By way of example, the thickness of the optical articles may be at most 15 millimeters (mm), preferably in the range 0.1 mm to 5 mm, and more preferably in the range 0.5 mm to 4 mm.

Typically, the optical article may be manufactured from said transparent polymer material using any forming method that is well known to the skilled person, such as thermoforming, extrusion, calendaring, drawing, injection, injection-compression, or blow molding; the optical article retains all of the mechanical and optical properties of said polymer material.

DETAILED DESCRIPTION

Other characteristics and advantages of the present invention become apparent from the following examples; said examples are given by way of non-limiting illustration.

EXAMPLES

The origins of the various constituents used are as follows:
the polycarbonate used (PC or PCm), whether in the mixture of step i) or in the mixture of step ii), was a thermoplastic polycarbonate with reference Makrolon® A12647 marketed by Bayer AG;
the polystyrene was Empera® 251N, marketed by NOVA Innovene International SA;
the polymethyl methacrylate was marketed with reference 200336 by Sigma-Aldrich Co;
the nanoparticles were precipitated calcium carbonate particles with a dimension of approximately 60 nm sold by Solvay France under the trade name SOCAL® 31;
the antioxidant used in the various steps of the method was Ultranox® 626, marketed by Crompton N.V.;
the compatibilizing agent AgCp1 was a copolymer of polystyrene and maleic anhydride comprising 7% maleic anhydride, marketed under reference 426946 by Sigma-Aldrich Co;
the compatibilizing agent AgCm1 was Cloisite® 20A, marketed by Southern Clay Products, Inc;
the compatibilizing agent AgCm2 was Cloisite® 30B, marketed by Southern Clay Products, Inc.

In more detail, the dimension of the SOCAL® 31 particles was determined by TEM using a magnification of 40000 measured on about twenty images, dispersing these nanoparticles initially in ethanol then placing them on a copper screen and finally covering them with a transparent amorphous polymer film. This gave a width l, or number average dimension, as well as a length L, of 60 nm for these nanoparticles. Thus, according to the TEM analysis and direct measurements, the form factor L/l for these nanoparticles was of the order of 1.0.

Prior to preparing the polymer materials, the mineral nanoparticles and the polycarbonate, the polymethyl methacrylate and the polystyrene used in the examples below were oven dried at 120° C. for at least 12 hours (h).

The various samples were produced from said polymer materials extruded into a rod, cooled and then granulated.

The mixing steps detailed in the preparation methods P0 to P4 below were carried out using a twin screw re-circulation type micro-extruder with reference DSM micro 15 marketed by DSM Explore, with a shear rate of 40 revolutions per minute (rpm).

Example 1

Prior Art Preparation Method P0: Direct Incorporation of Nanoparticles Into a PC Matrix In accordance with a prior art preparation method P0, 0.45 grams (g) of mineral nanoparticles and 8.55 g of polycarbonate were mixed at 260° C. for 14 minutes (min).

A polymer material PM0 was thus obtained, including 5% by weight of mineral nanoparticles.

Example 2

Preparation Method P1, in Accordance with the Invention

According to a first preparation method P1 in accordance with the present invention, 4.5 g of mineral nanoparticles were mixed (step i)) with 4.5 g of polystyrene (PS) or polycarbonate (PC) at 260° C. for approximately 5 min to obtain the respective master-batches. Next, 0.9 g of each master-batch was mixed (step ii)) with 8.1 g of a polycarbonate matrix at 260° C. for 15 min. A polymer material PM1$_{PS}$ was thus obtained when the polymer of mixture i) was PS and a polymer material PM1$_{PC}$ was obtained when the polymer of mixture i) was PC.

The polymer materials obtained (PM1$_{PS}$ and PM1$_{PC}$) comprised 5% by weight of mineral nanoparticles.

Example 3

Preparation Method P2, in Accordance with the Invention

According to a second preparation method P2 in accordance with the present invention, 4.5 g of mineral nanoparticles was mixed (step i)) with 4.5 g of polystyrene (PS) or polymethyl methacrylate (PMMA) or a composition A2 comprising a polycarbonate (PC) and an antioxidant, at 260° C. for 5 min, to obtain respective master-batches.

In this context, said composition A2 was prepared prior to step i) by mixing, at 260° C. for 5 min, 90 parts by weight of polycarbonate with 10 parts by weight of antioxidant per 100 parts by weight of composition A2.

A composition B2 was prepared by mixing, at 260° C. for 3 min, 98.9 parts by weight of polycarbonate and 1.1 parts by weight of antioxidant per 100 parts by weight of composition B2. Next, 0.9 g of each master-batch was mixed (step ii)) with 8.1 g of composition B2, at 260° C. for 10 min, in order to disperse the nanoparticles properly in said mixtures. A polymer material PM2$_{PS}$ was obtained when the polymer of the mixture i) was PS, a polymer material PM2$_{PMMA}$ was obtained when the polymer of the mixture i) was PMMA and a polymer material PM2$_{PC}$ was obtained when the polymer of mixture i) was PC.

The polymer materials obtained (PM2$_{PS}$, PM2$_{PMMA}$, PM2$_{PC}$) comprised 5% by weight of mineral nanoparticles.

Example 4

Preparation Method P3, in Accordance with the Invention

In accordance with a third preparation method P3 in accordance with the present invention, 4.5 g of mineral nanoparticles was mixed (step i)) with 4.5 g of polystyrene (PS) at 260° C. for 5 min, to obtain a master-batch. A composition B3 was prepared by mixing, at 260° C. for 3 min, 97.8 parts by weight of polycarbonate, 1.1 parts by weight of antioxidant and 1.1 parts by weight of polymeric type compatibilizing agent AgCp1 per 100 parts by weight of composition B3. Next, 0.9 g of master-batch was mixed (step ii)) with 8.1 g of composition B3, at 260° C. for 11 min, in order to properly disperse the nanoparticles in said mixture.

A polymer material PM3$_{AgCp1}$ was obtained comprising 5% by weight of mineral nanoparticles.

Example 5

Preparation Method P4, in Accordance with the Invention

In accordance with a fourth preparation method P4 of the present invention, 4.5 g of mineral nanoparticles was mixed (step i)) with 4.5 g of polymethyl methacrylate (PMMA) at 260° C. for 5 min to obtain a master-batch.

A composition B4 was prepared by mixing, at 260° C. for 3 min, 98.9 parts by weight of polycarbonate and 1.1 parts by weight of antioxidant per 100 parts by weight of composition B4. Next, 0.9 g of said master-batch was mixed (step ii)) with 0.03 g of a AgCm1 or AgCm2 type compatibilizing agent and with 8.07 g of composition B4 at 260° C. for 11 min in order to disperse the nanoparticles properly in said mixture. A polymer material PM4$_{AgCm1}$ was obtained when the polymeric type compatibilizing agent was AgCm1, and a polymer material PM4$_{AgCm2}$ was obtained when the polymeric type compatibilizing agent was AgCm2.

The various polymer materials obtained (PM4$_{AgCm1}$, PM4$_{AgCm2}$) comprised 5% by weight of mineral nanoparticles.

Physico-Chemical Characteristics of Materials Obtained:

The various physico-chemical characteristics studied were light transmission, bending modulus and molecular weight.

A material termed a reference material (RM) was also produced uniquely from the polycarbonate used in the various methods P0 to P4, in the form of samples.

Light Transmission:

The light transmission characterizes the transparency of the polymer material. The higher the light transmission, the better the transparency of said material.

The light transmission measurements were carried out on samples in the form of disks 25 mm in diameter and 1.5 mm in thickness using a Cary 50 spectrometer marketed by Varian. The disks were obtained from granules of polymer materials RM and PM0 to PM4 shaped by injection molding using a DSM 5 cubic centimeter (cm$^3$) micro-injector marketed by DSM Explore. The temperature of the micro-injector cylinder was fixed at 290° C. and the temperature of the mold was fixed at 60° C.; the granules were heated for 2 min prior to injection.

Molecular Weight:

The molecular weight measurements were carried out on samples in the form of powders. The powder was obtained by milling granules of polymer materials RM and PM0 to PM4 using a cryogenic mill. A quantity of 50 milligrams (mg) of said powder was then dissolved in 10 milliliters (mL) of tetrahydrofuran (THF) and filtered at 0.45 micrometers (μm).

The molecular weight was determined using a chromatograph provided with a Waters SIS-HPLC pump, a Waters 410 differential refractometer, Styragel 5 μm HR4 and HR3 columns marketed by Waters, and a PI-gel 5 μm column marketed by Polymer Laboratories.

The measurement processing software was Millennium 32 software marketed by Waters.

Bending Modulus:

The bending modulus characterizes the rigidity of a polymer material. The higher the bending modulus, the better the rigidity of said material.

The bending modulus measurements were carried out on samples in the form of 4 mm×40 mm×1.5 mm bars.

The bars were obtained from granules of polymer materials RM and PM0 to PM4 formed using a hydraulic thermo-compression press with heated plates from DARRAGON. The bending modulus of said bars was determined using a VA4000 visco-analyzer marketed by Metravib.

The sample was heated to a temperature of 30° C. at a heating rate of 3 degrees Celsius per minute (° C./min). Next, the modulus was measured at a 30° C. constant temperature stage over 10 min. The applied oscillation frequency was 1 hertz (Hz) and the dynamic movement (amplitude of oscillations) was 5 μm.

The results obtained are shown in the table below. The transmission values are given for a wavelength of 650 nm.

| Preparation method | Polymer material | Light transmission (%) | Molecular weight (g · mol$^{-1}$) | Bending modulus (GPa) |
|---|---|---|---|---|
| / | RM | 87.8 | 52500 | 2.35 |
| P0 | PM0 | 19.4 | 22400 | NM* |
| P1 | PM1$_{PC}$ | 65.2 | 36200 | 2.61 |
|  | PM1$_{PS}$ | 65.9 | 50700 | 2.96 |
| P2 | PM2$_{PC}$ | 68.4 | 47300 | 3.11 |
|  | PM2$_{PS}$ | 72.2 | 49700 | 2.94 |
|  | PM2$_{PMMA}$ | 71.1 | 47200 | 2.92 |
| P3 | PM3$_{AgCp1}$ | 65.2 | 50700 | 3.28 |
| P4 | PM4$_{AgCm1}$ | 71.0 | 46500 | 2.92 |
|  | PM4$_{AgCm2}$ | 70.0 | 45300 | 3.45 |

*NM: not measured since too brittle

It can thus be seen that methods P1 to P4, compared with direct incorporation in accordance with method P0, can significantly reduce the loss of light transmission induced by the presence of nanoparticles. The loss of light transmission of the polymer materials PM1 to PM4 relative to the reference material RM is at most 25% compared with the reference material RM. The polymer material PM0 has a loss of transmission of more than 40% compared with the reference material RM. The polymer materials PM1 to PM4 thus have very satisfactory transparency.

It can also be seen that the values for the bending modulus for the polymer materials PM1 to PM4 exhibit a significant increase in said modulus relative to the value for the bending modulus of the reference material RM. Thus, incorporating nanoparticles using the preparation methods of the present invention can substantially increase the rigidity of the polymer materials by more than 20%.

Furthermore, it can be seen that the polymer materials PM1 to PM4 have a molecular weight that tends significantly towards the value 52500 grams per mole (g/mol$^{-1}$), the value of the molecular weight of the reference material RM, in contrast to the polymer material PM0 for which the value drops by more than 50%. Too large a drop in the molecular weight, i.e. more than 30%, signifies a major degradation of the matrix.

Furthermore, the polymer materials PM2 show that adding an antioxidant indirectly to the mixture of step ii) (methods P2, P3 and P4) significantly improves the physico-chemical characteristics of said materials.

Finally, using a compatibilizing agent can also optimize the bending modulus, and in particular can increase said modulus by approximately 46% (PM4$_{AgCm2}$).

Thus, the results of the above table show that preparation methods P1 to P4 can produce transparent polymer materials PM1 to PM4 with optimal transparency while improving the mechanical properties.

The invention claimed is:

1. A method of preparing a transparent polymer material, the method comprising the following steps:
   i) mixing mineral nanoparticles selected from the group consisting of nanoparticles of alkaline-earth metal carbonates and alkaline-earth metal sulfates and a composition A including at least one thermoplastic polymer in the molten state selected from the group consisting of polycarbonate (PC), polystyrene (PS) and polymethyl methacrylate (PMMA) in order to obtain a master-batch, the mixture of step i) including at least 25% and at most 75% by weight of said mineral nanoparticles; and
   ii) mixing the master-batch obtained in step i) with a composition B comprising a transparent thermoplastic polycarbonate matrix (PCm) in the molten state, to obtain the transparent polymer material including at most 10% by weight of said mineral nanoparticles, wherein said addition of said master batch including said nanoparticles is added in an amount, concentration and manner to said transparent thermoplastic polycarbonate matrix (PCm) such that it results in said transparent thermoplastic polycarbonate matrix having no more than a 25% reduction in light transmission percentage relative to a reference material of a transparent thermoplastic polycarbonate matrix (PCm) having no master batch included, such that there is no significant loss of contrast to an object viewed therethrough
   wherein said polymer material has a light transmission loss at 650 nm, compared with a reference material obtained solely from the thermoplastic polycarbonate matrix (PCm), of at most 25%, and
   wherein said polymer material has a molecular weight loss, compared with a reference material obtained solely from the transparent thermoplastic polycarbonate matrix (PCm), of at most 30%.

2. The method according to claim 1, wherein the mixture of step i) includes at least 40% and at most 60% by weight of said mineral nanoparticles.

3. The method according to claim 1, wherein the dimension of the mineral nanoparticles is at most 300 nm.

4. The method according to claim 1, wherein the mineral nanoparticles are selected from nanoparticles of calcium carbonate, and barium sulfate.

5. The method according to claim 1, wherein the mixture of step ii) further includes at least one antioxidant.

6. The method according to claim 5, wherein the composition B is prepared prior to step ii) by mixing an antioxidant with transparent thermoplastic polycarbonate matrix (PCm) in the molten state.

7. The method according to claim 6, wherein the composition B includes at most 5% by weight of antioxidant.

8. The method according to claim 5, wherein the composition A is prepared prior to step i) by mixing an antioxidant with the thermoplastic polymer in the molten state.

9. The method according to claim 8, wherein composition A includes at most 15% by weight of antioxidant.

10. The method according to claim 5, wherein said antioxidant is added directly to the mixture of step ii) and/or to the mixture of step i).

11. The method according to claim 5, wherein the mixture of step ii) includes at most 5% by weight of antioxidant.

12. The method according to claim 5, wherein the antioxidant includes a phosphite.

13. The method according to claim 1, wherein the mixture of step ii) further includes a compatibilizing agent when the mixture of step i) comprises polystyrene (PS) and/or polymethyl methacrylate (PMMA).

14. The method according to claim 13, wherein the compatibilizing agent is a natural montmorillonite surface-modified with hydroxyl functional groups.

15. The method according to claim 13, wherein the compatibilizing agent is a copolymer of polystyrene and maleic anhydride.

16. The method according to claim 13, wherein the mixture of step ii) includes at most 5% by weight of compatibilizing agent.

17. A transparent polymer material obtained by the method defined in claim 1.

18. The polymer material according to claim 17, wherein said polymer material has a bending modulus increase, compared with a reference material obtained solely from the transparent thermoplastic polycarbonate matrix (PCm), of at least 10%.

19. A method for manufacturing optical articles of aiming instrumentation lenses, helmet visores, or ophthalmic lenses, said method comprising the step of:
forming said optical articles with the polymer material according to claim 17.

20. A method for manufacturing optical articles of the automobile glass, said method comprising the step of:
forming said optical articles with the polymer material according to claim 17.

21. A method for manufacturing optical articles with a thickness of at most 15 mm, said method comprising the step of:
forming said optical articles with the transparent polymer material according to claim 17.

22. The method of claim 1, wherein said transparent polymer material includes at most 5% by weight of said mineral nanoparticles.

23. The method according to claim 3, wherein the dimension of the mineral nanoparticles is at most 100 nm.

24. The method according to claim 3, wherein the dimension of the mineral nanoparticles is in the range 10 nm to 70 nm.

25. The method according to claim 7, wherein the composition B is in the range 0.5% to 2% by weight of antioxidant.

26. The method according to claim 9, wherein the composition A is in the range 2% to 12% by weight of antioxidant.

27. The method according to claim 9, wherein the composition A is 10% by weight of antioxidant.

28. The method according to claim 11, wherein the mixture of step ii) is in the range 1% to 2% by weight of antioxidant.

29. The method according to claim 16, wherein the mixture of step ii) includes in the range 0.1% to 2% by weight of compatibilizing agent.

30. The method according to claim 16, wherein the mixture of step ii) includes in the range 0.3% to 1% by weight of compatibilizing agent.

31. The polymer material according to claim 17, wherein said polymer material has a light transmission loss at 650 nm, compared with a reference material obtained solely from the transparent thermoplastic polycarbonate matrix (PCm), of at most 10.

32. The polymer material according to claim 17, wherein said polymer material has a light transmission loss at 650 nm, compared with a reference material obtained solely from the transparent thermoplastic polycarbonate matrix (PCm), of at most 1% to 3%.

33. The polymer material according to claim 18 wherein said polymer material has a bending modulus increase, compared with a reference material obtained solely from the transparent thermoplastic polycarbonate matrix (PCm), in the range 20% to 60%.

34. The polymer material according to claim 17, wherein said polymer material has a molecular weight loss, compared with a reference material obtained solely from the transparent thermoplastic polycarbonate matrix (PCm), of at most 20%.

35. The polymer material according to claim 17, wherein said polymer material has a molecular weight loss, compared with a reference material obtained solely from the transparent thermoplastic polycarbonate matrix (PCm), of at most 10%.

36. A method for manufacturing optical articles with a thickness in the range 0.1 mm to 5 mm, said method comprising the step of:
forming said optical articles with the transparent polymer material according to claim 17.

37. A method for manufacturing optical articles with a thickness in the range 0.5 mm to 4 mm, said method comprising the step of:
forming said optical articles with the transparent polymer material according to claim 17.

* * * * *